United States Patent
Lichtman et al.

(10) Patent No.: US 6,795,609 B1
(45) Date of Patent: Sep. 21, 2004

(54) VIRTUAL BIDIRECTIONAL CONNECTION SYSTEM FOR UNIDIRECTIONAL PROCESSING CARDS

(75) Inventors: Eyal Lichtman, Ramat Gan (IL); Erik Hendell, Tel Aviv (IL)

(73) Assignee: Atrica Ireland Limited, Dublin (IE)

( * ) Notice: Subject to any disclaimer, the term of this patent is extended or adjusted under 35 U.S.C. 154(b) by 0 days.

(21) Appl. No.: 10/179,527

(22) Filed: Jun. 24, 2002

(51) Int. Cl.$^7$ .............................................. G02B 6/26
(52) U.S. Cl. ...................................................... 385/24
(58) Field of Search ................................ 385/24, 31, 39, 385/42, 134

(56) References Cited

U.S. PATENT DOCUMENTS

| | | | |
|---|---|---|---|
| 4,529,986 A | | 7/1985 | d'Auria et al. ............. 343/423 |
| 5,394,489 A | * | 2/1995 | Koch ........................... 385/14 |
| 5,394,503 A | * | 2/1995 | Dietz et al. ................. 385/135 |
| 5,521,992 A | * | 5/1996 | Chun et al. ................... 385/14 |
| 5,761,353 A | | 6/1998 | Van Der Tol et al. ........ 385/16 |
| 5,999,097 A | * | 12/1999 | Liddle et al. ............... 340/550 |
| 6,185,348 B1 | * | 2/2001 | Shahid ......................... 385/49 |
| 6,606,427 B1 | * | 8/2003 | Graves et al. ................ 385/17 |

* cited by examiner

*Primary Examiner*—Tulsidas C. Patel
(74) *Attorney, Agent, or Firm*—Howard Zaretsky; Zaretsky & Associates PC

(57) ABSTRACT

A connection mechanism permitting a unidirectional processing device to function as a virtual bi-directional processing device. A pass through dummy connection is inserted in a unidirectional circuit card to permit the connection of standard keyed duplex-paired cables to other processing cards. The use of keyed cables to connect the various circuit cards in a system reduces the burden of a user to manually insure that all cables are properly connected between cards. The pass through dummy connection may be any suitable media such as optical fiber for optical signals or electrical cable, wire or printed circuit board traces for electrical signal.

19 Claims, 3 Drawing Sheets

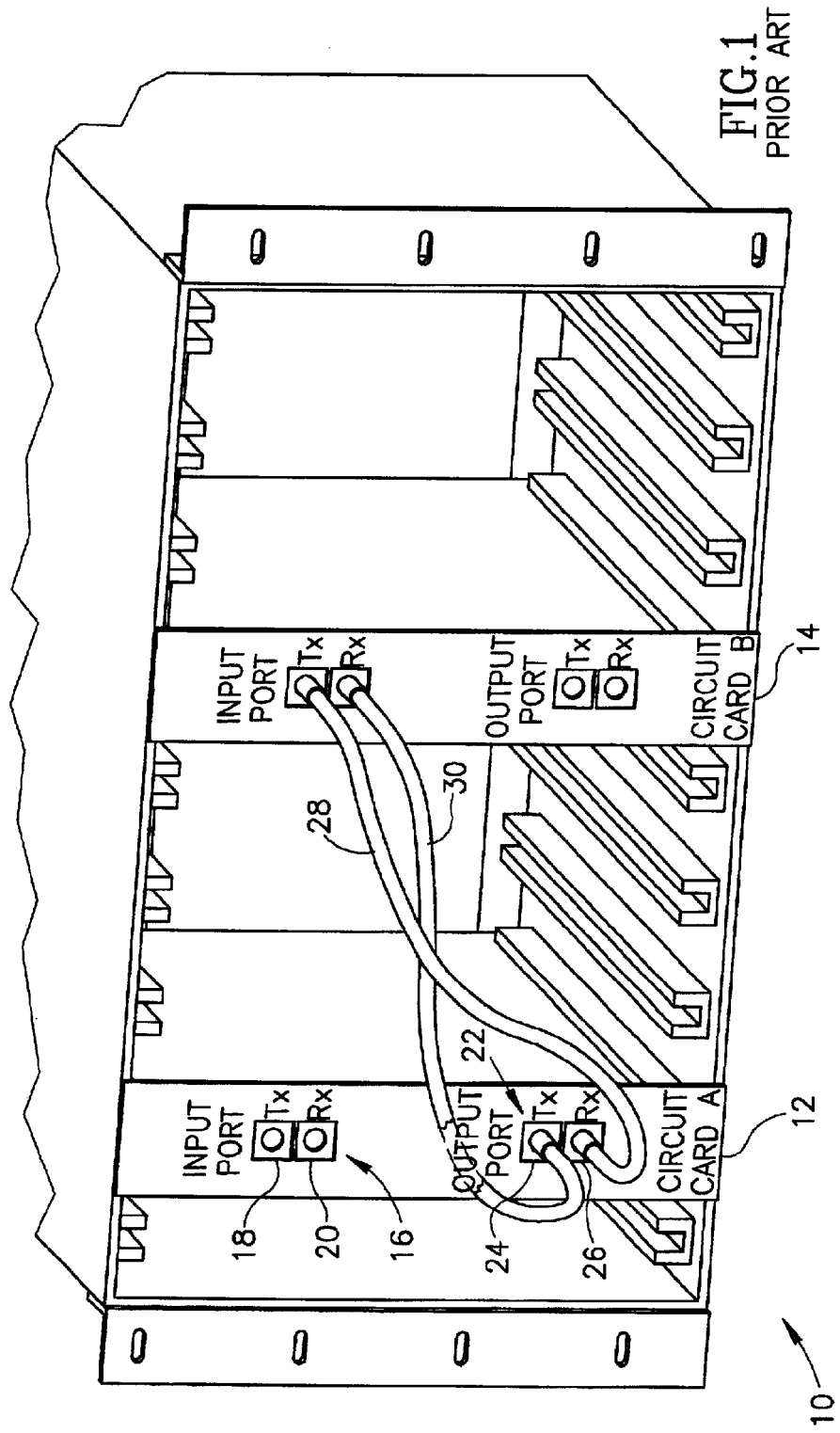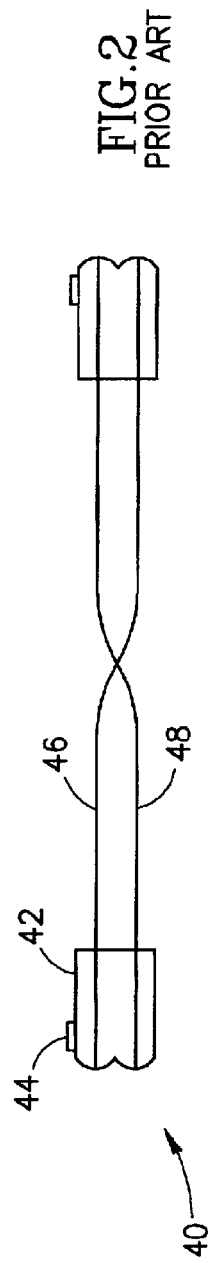

VIRTUAL BIDIRECTIONAL CONNECTION SYSTEM FOR UNIDIRECTIONAL PROCESSING CARDS

FIELD OF THE INVENTION

The present invention relates generally to optical networks and more particularly relates to a virtual bi-directional connection system for connecting unidirectional devices to other bi-directional devices.

BACKGROUND OF THE INVENTION

Optical communication systems are becoming increasingly widespread due mainly to the very large bandwidths they offer for carrying information. The growth and diversity of lightwave networks, such as Wavelength Division Multiplexed (WDM) and Dense WDM (DWDM) networks are placing new demands on all aspects of optical networks including, for example, capacity management and provisioning, maintenance, and reliable and robust operation.

Currently, high capacity optical networks are constructed as rings and use WDM technology to achieve high bandwidth capacities. For example, WDM ring networks are in commonly used in metropolitan area network (MAN) applications but can also be used in LANs and WANs.

Wavelength division multiplexed (WDM) optical networks are particularly desirable because of their restoration capabilities and suitability for minimizing the number of optical fibers for the interconnection of system nodes. A typical WDM optical ring network includes network elements with optical add/drop multiplexers (OADMs), whereby some optical channels are dropped, some are added and/or other channels are expressed or passed through.

In a ring topology, each ring node is connected to exactly two other ring nodes. The OADMs are used to construct a ring network whereby adjacent OADMs are connected pair wise while the network nodes are adapted to form a ring. In a ring network, any node can be reached from any other node using two physically separate paths, i.e. one traveling clockwise and one counter clockwise. This is used for providing protection against route failures. The use of at least two parallel fibers with traffic flowing in opposite directions provides restoration capabilities in the event of a fiber cut.

An Optical Add/Drop Multiplexer (OADM) functions to filter or drop one or more wavelengths transiting on the ring. The optical technologies usable for producing an OADM can be placed in two main categories, namely: (1) those using fixed filtering, whereby an OADM is produced for dropping and adding a fixed wavelength, and (2) those using tunable filtering, whereby an external control determines the wavelength of the dropped and added channel.

Normally, only a single wavelength of light is used to carry optical signals from one node to another. To increase the communications bandwidth of the network, however, it is common to transmit light signals having multiple wavelengths. Additional signal channels can be added using well-known DWDM techniques wherein each channel corresponds to a different wavelength of light.

As is common practice in DWDM optical networks, OADMs are used to drop, add or express one or more optical channels. The OADM comprises a drop module adapted to generate a drop channel from the multi-wavelength input signal and an add module adapted to add a channel to the multi-wavelength output signal.

Many of the optical based devices and components used to construct optical networks function to process an input optical signal to generate an output optical signal. Both input and output optical signals (i.e. ingress and egress signals) comprise separate signals for both transmit and receive directions. A diagram of an example prior art optical networking rack having a plurality of optical networking cards is shown in FIG. 1. The optical card cage, generally referenced 10, comprises a plurality of slots for optical circuit cards. Two are shown to illustrate the typical connections that occur between processing cards. Bi-directional processing cards 12, 14, labeled circuit card A and circuit card B, comprise input ports 16 and output ports 22. The input port comprises individual transmit (Tx) 18 and receive (Rx) 20 ports. Similarly, the output port 22 comprises individual transmit 24 and receive 26 ports.

To connect one processing card to another, a pair of cables 28, 30 is used to connect the transmit and receive ports from the output port of one card to the input port of the card in the downstream processing path. More particularly, one cable 28 functions to connect the output transmit port of one card to the input receive port of the downstream card. The second cable 30 functions to connect the output receive port of one card to the input transmit port of the downstream card. In this manner, the various bi-directional optical processing cards are connected together.

One way to connect the ports from one card to another is to use individual optical fiber cables for each pair of connections. Great care must be given to connecting each cable to the correct port An alternative is to use a special paired cable that is keyed on each end. A diagram of a prior art bi-directional optical cable including keyed transmit and receive optical fiber connections is shown in FIG. 2. The cable, generally referenced 40, comprises keyed connectors 44 on each end of a pair of optical fiber cables 46, 48. The cables are crossed to insure that a transmit port is connected to a receive port and vice versa. A key 44 comprising a tab or other keying mechanism is used to guarantee that the orientation of the cable is correct when a user connects the cable to the port A block diagram of example prior art bi-directional optical circuit cards connected together via a keyed cable comprising transmit and receive fibers is shown in FIG. 3. The example system, generally referenced 50, comprises two optical circuit cards 52, labeled circuit card A and circuit card B, connected via keyed optical pair cable 60. Each circuit card is a bi-directional processing circuit card having a processing circuit 56, an input port 54 and output port 58. Each port further comprises transmit and receive connections. During installation of the cards, a user manually connects the output port of circuit card A to the input port of circuit card B. To insure the correct orientation of the connections, the keyed cable is used which forces the user to properly connect the ports together. As long as a keyed cable is used, the transmit port of one card will always be connected to the receive port of the other card. Likewise, the receive port of one card will always be connected to the receive port of the other card.

A problem arises, however, when connecting unidirectional processing cards to other processing cards in the system. The problem is that unidirectional cards only process signals in one direction. These types of cards only have a single input and output which force the user to apply great care when connecting them in a system. This problem is illustrated in FIG. 4 which shows a block diagram of several prior art optical circuit cards that include both bi-directional and unidirectional devices.

The system, generally referenced 70, comprises two bi-directional processing cards 72, labeled circuit card A and circuit card B, connected to a unidirectional processing card 80. Circuit cards A and B comprise a processing circuit 78 and input ports 74 and output ports 76, each comprising transmit and receive connections. The unidirectional card in this example is an amplifier card having only an input receive port 84 connected to the output transmit port of circuit card A via optical cable 88 and an output transmit port 86 connected to the input receive port of circuit card B via optical cable 90.

Since the amplifier card functions to only process the signal output of card A the input transmit signal from circuit card B is connected directly to the output receive port of circuit card A via optical cable 92. Thus, cable 92 is connected so as to bypass the amplifier card altogether. A problem with this arrangement, however, is that standard keyed optical cables cannot be used since the amplifier card does not process optical signals in both directions. Thus, great care must be exercised by the user when connecting the circuit cards together that include one or more unidirectional devices such as amplifiers, etc. If the proper care is not exercised, improper connection between the input and output parts on the processing cards will result thus preventing the proper operation of the network system or potentially causing damage to one or more components in the optical system.

There is thus a need for a connection scheme for optical networking devices employing unidirectional processing cards that permits the use of keyed optical cables to insure the proper connection of the input and output ports of the various processing cards making up the system.

SUMMARY OF THE INVENTION

The present invention is a connection mechanism permit a unidirectional processing device to function as a virtual bi-directional processing device. The invention has applications in any device that employs a unidirectional processing element, such as a circuit card. Use of the invention enables unidirectional processing cards to be connected to bi-directional cards using standard keyed cable assemblies. The invention can be used in both optical and electrical processing card environments. In particular, the invention is suited for use in unidirectional optical processing cards such as these comprising Erbium Doped Fiber Amplifiers (EDFAs) or dispersion compensation modules (DCMs).

In accordance with the present invention, a dummy connection is inserted in the circuit card to permit the connection of standard paired cable assemblies. The standard paired cables may or may not be keyed. The use of keyed cables to connect the various circuit cards in a system reduces the responsibility of a user to insure that the cables are properly connected since keyed cables only allow installation in one way, the correct way. The dummy connection is a passive connection that may comprise any suitable media type such as optical or electrical.

Implementation of the virtual bi-directional connection mechanism of the present invention does not require modification of the unidirectional processing elements on a circuit card. Conventional unidirectional processing elements may be used unchanged. An additional output receive terminal and input transmit terminal are added and the two connected internally by the dummy connection.

A key advantage of the present invention is that it enables unidirectional processing cards to be connected as if they were bi-directional processing cards thus permitting the use of standard keyed cable assemblies in connecting them to other processing cards.

There is thus provided in accordance with the present invention an apparatus for use in a unidirectional processing card having an input receive port and an output transmit port comprising an output receive port, an input transmit port and dummy connection means for connecting the output receive port to the input transmit port.

There is also provided in accordance with the present invention a virtual bi-directional processing apparatus comprising an input port comprising a transmit connector and a receive connector, an output port comprising transmit connector and a receive connector, a unidirectional optical processing element connected between the receive connector of the input port and the transmit connector of the output port and a dummy optical fiber connecting the receive connector of the output port to the transmit connector of the input port.

There is further provided in accordance with the present invention an optical network device comprising a plurality of bi-directional processing cards each having a first input port with transmit terminal and receive terminal and a first output port with transmit terminal and receive terminal, one or more unidirectional processing cards each having a second input port with transmit terminal and receive terminal and a second output port with transmit terminal and receive terminal and wherein each one or more unidirectional processing cards comprises a unidirectional processing element coupled between the receive terminal of the second input port to the transmit terminal of the second output port and a dummy optical fiber connecting the receive terminal of the second output port to the transmit terminal of the second input port.

BRIEF DESCRIPTION OF THE DRAWINGS

The invention is herein described, by way of example only, with reference to the accompanying drawings, wherein:

FIG. 1 is a diagram of an example prior art optical networking rack having a plurality of optical networking cards;

FIG. 2 is a diagram of a prior art bi-directional optical cable including keyed transmit and receive optical fiber connections;

DETAILED DESCRIPTION OF THE INVENTION

Notation Used Throughout

The following notation is used throughout this document.

| Term | Definition |
| --- | --- |
| DCM | Dispersion Compensation Modules |
| DWDM | Dense Wave Division Multiplexing |
| EDFA | Erbium Doped Fiber Amplifier |
| LAN | Local Area Network |
| MAN | Metropolitan Area Network |
| OADM | Optical Add Drop Multiplexer |
| WAN | Wide Area Network |
| WDM | Wave Division Multiplexing |

Detailed Description of the Invention

The present invention is a connection mechanism to permit a unidirectional processing, device to function as a virtual bi-directional processing device. The invention has applications in any device, such as a circuit card, that employs a unidirectional processing element. Use of the invention enables unidirectional processing card, to be connected to bi-directional card using standard keyed cable assemblies. The invention can be used in both optical and electrical processing, card environments. In particular, the invention is suited for use in unidirectional optical processing cards such as those comprising Erbium Doped Fiber Amplifiers (EDFAS) or dispersion compensation modules (DCMS).

To aid in illustrating the principles of the present invention, the virtual bi-directional mechanism of the present invention is described in the context of an optical processing card suitable for use in a WDM or DWDM optical network. The invention, however, is not limited to this application, as one skilled in the communication arts can apply the virtual bi-directional mechanism of the present invention to other types of processing cards, media, network topology and configurations without departing from the spirit and scope of the present invention. For example, the invention is well suited for use with electrical processing devices as well as with optical processing devices.

Throughout this document, the term circuit card is defined as any processing device printed circuit board, processing card, network box, module, assembly unit or element that functions stand alone or is intended to be inserted into a card case or rack of circuit cards, and is either optical or electrical based or based on a combination thereof. A terminal is defined as a connection on a circuit card, either optical or electrical, that is used to mate with an external cable connector or cable assembly in which the connector is a part thereof. A unidirectional circuit element is defined as any processing element that is designed to process one or more signals in one direction only. Such elements are assembled in circuit cards that normally comprise a single input terminal and a single output terminal for connection to other carts.

To overcome the limitations of the prior art the present invention provides a virtual bi-directional connection mechanism whereby a dummy connection is inserted in a circuit card having a unidirectional processing element to permit the use of standard paired cable a assemblies to connect the card or device to other bi-directional cards or devices.

Figure 3:
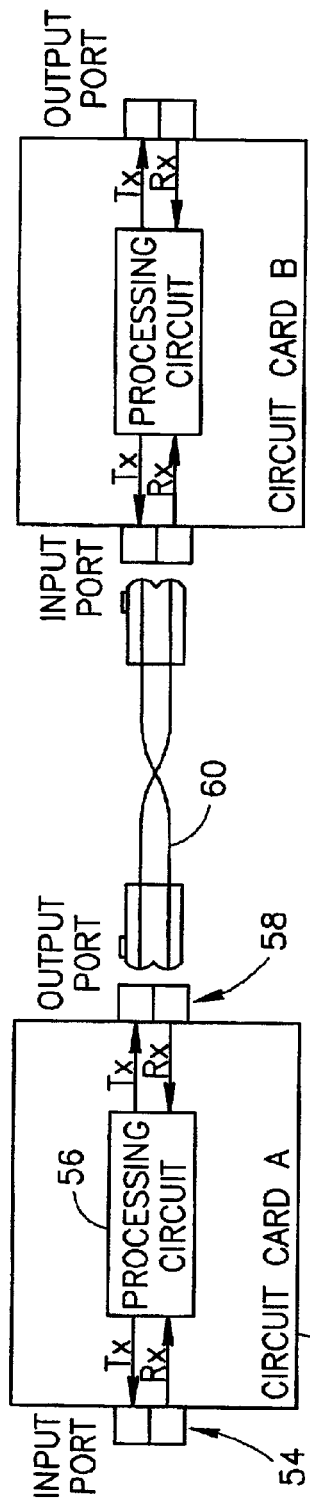
FIG. 3 is a block diagram of example prior art bi-directional optical circuit cards connected together via a keyed cable comprising transmit and receive fibers.
Figure 4:
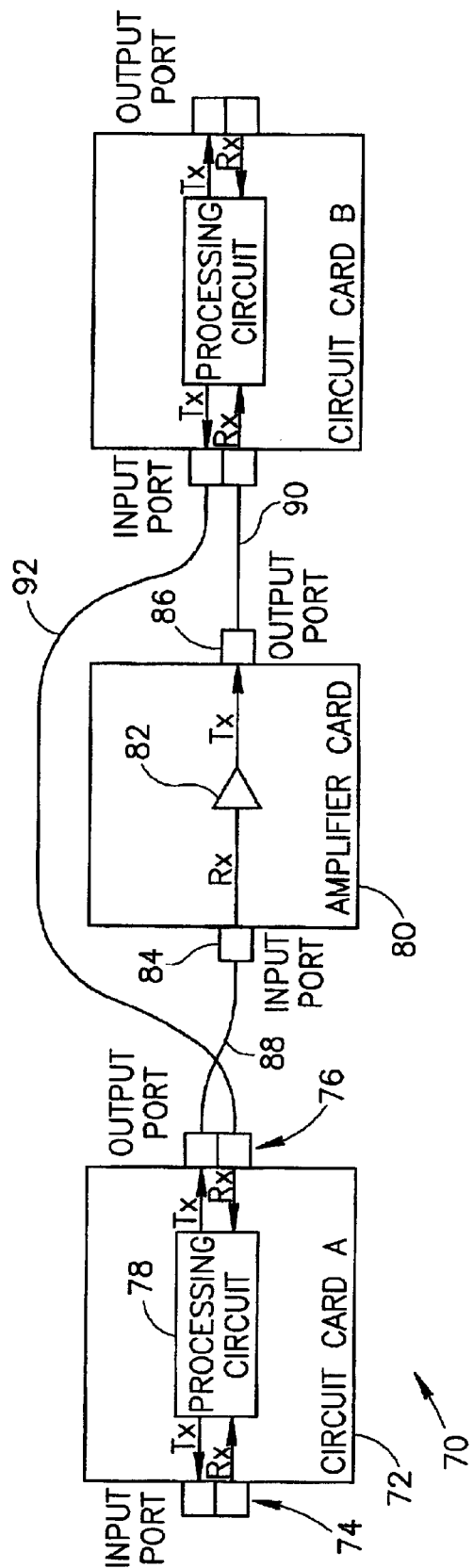
FIG. 4 is a block diagram of example prior art optical circuit cards including both bi-directional and unidirectional devices.
Figure 5:
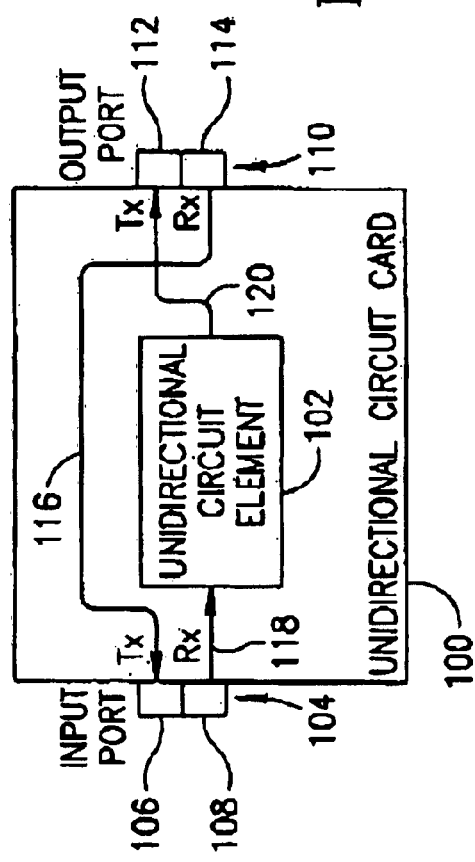
FIG. 5 is a block diagram illustrating an example embodiment of the bi-directional connection system of the present invention.

A block diagram illustrating an example embodiment of the bi-directional connection system of the present invention is shown in FIG. 5. The unidirectional circuit card generally referenced 100, comprises a unidirectional circuit element 102, input port 104 and output port 110. The unidirectional circuit element is connected to an input receive terminal 108 via connection 118 and to an output transmit terminal 112 via connection 120. The dummy connection 116 is adapted to connect the output receive port 114 the input transmit port 106.

The dummy connection may comprise any suitable media depending on the function of the unidirectional circuit card. In the case where the circuit card is an optical processing card, the dummy connection comprises an optical fiber. In the case where the circuit card is an electrical processing card, the dummy connection comprises an electrical connection such as a wire, cable, printed circuit trace, etc.

The dummy connection functions as a pass through to signals received from downstream processing cards, passing them through unchanged to the transmit terminal of the input port for connection to upstream processing cards. The use of the dummy connection in the unidirectional processing circuit card permits it to be connected to other cards as if it were a virtual bi-directional processing card. Standard keyed duplex connector cables, such as standard crossed duplex optical fiber cables with duplex cables and connectors, may be used to connect the unidirectional circuit card to other cards thus permitting fast, simple connections to other optical or electrical circuit cards. Use of the invention provides fast and simple installation and connectivity because connection verification does not have to be performed. The use of standard keyed duplex cables or cable assemblies eliminates this requirement.

Optical duplex cables suitable for use with the present invention are commercially available from numerous companies such as Agilent Technologies Inc. Palo Alto, Calif. or Diamond SA. Losone, Switzerland.

Standard pawed duplex cables may or may not be keyed. The use of keyed cables to connect the various circuit cards in a system reduces the burden on the installer or technician by eliminating the need to verify that the cable is installed correctly since keyed duplex cables only allow installation in one way, the correct way.

Figure 6:
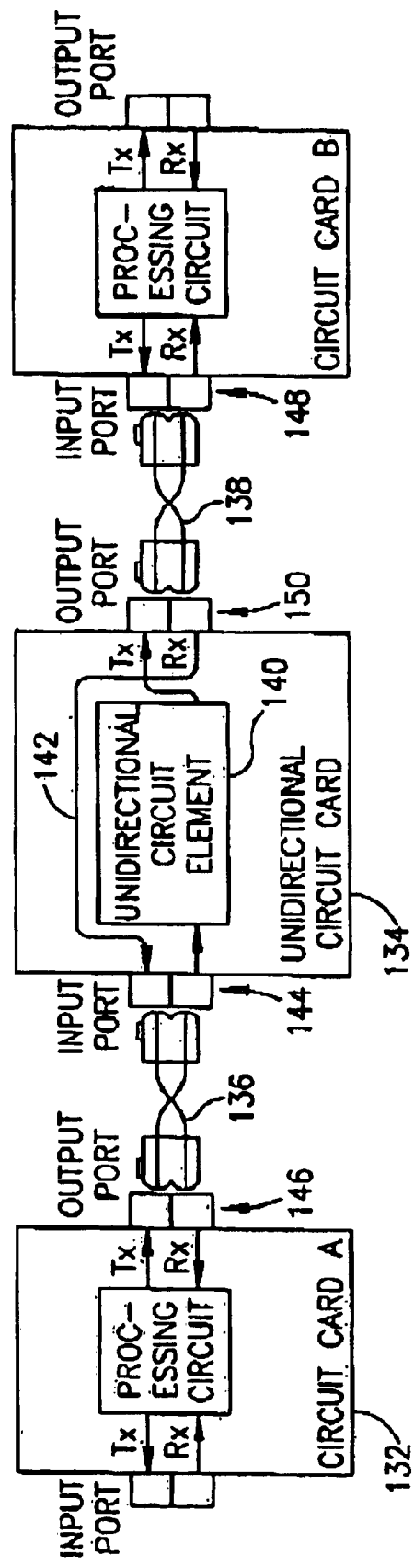
FIG. 6 is a block diagram of an example application of the bi-directional connection system of the present invention to connect several bi-directional optical devices to a unidirectional optical device.

A block diagram of an example application of the bi-directional connection system of the present invention to connect several bi-directional optical devices to a unidirectional optical device is shown in FIG. 6. The system, generally referenced 130, comprises two bi-directional circuit cards 132, labeled circuit card A and circuit card B and a unidirectional circuit card 134 connected to the bi-directional circuit cards. The output port 146 of circuit card A is connected to the input port 144 of the unidirectional circuit card via keyed duplex cable 136. The input port 148 of circuit card B is connected to the output port 150 of the unidirectional circuit card via keyed duplex cable 138.

A dummy connection 142 connects the output receive port to the input transmit port to permit the use of standard keyed duplex cables 136, 138. The unidirectional processing element 140 may comprise any suitable processing element depending on the application such as an optical amplifier or dispersion compensation module in the case of an optical element or an electrical amplifier or filter in the case of an electrical based device.

The use of the dummy connection permits the use of standard duplex cables 136, 138 in connecting the unidirectional processing card with bi-directional processing cards.

This eliminates the need for an installer, technician or user to manually verify the correct orientation and connection of cables.

Note that the invention is not to be limited to the examples provided hereinabove as one skilled in the art can apply the principles of the present invention to other network, processing and circuit card configurations as well. For example, the invention may be used with any number of unidirectional processing elements resulting in any number of unidirectional circuit cards and with any number of bi directional circuit cards as well. In addition, unidirectional circuit cards having different media (e.g., optical and electrical) may be used within the same system or network.

It is intended that the appended claims rover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention

What is claimed is:

1. An apparatus for use in a unidirectional circuit card having an input receive port and an output transmit port, comprising:
   an output receive port associated with said output transmit port;
   an input transmit port associated with said input receive port;
   a unidirectional circuit element connected to said input receive port and said output transmit port; and
   pass through connection means comprising a passive non-switched fixed path coupling said output receive port to said input transmit port such that signals received from a downstream device at said output receive port are sent unchanged over said passive non-switched fixed path to said input transmit port for transmission to an upstream device thereby enabling the upstream connection of said input transmit port and said input receive port to said upstream device using a first standard duplex connection cable, and the downstream connection of said output transmit port and said output receive port to said downstream device using a second standard duplex connector cable.

2. The apparatus according to claim 1, wherein said pass through connection mean is adapted to permit connection of a keyed cable assembly to said unidirectional processing card.

3. The apparatus according to claim 1, wherein said pass through connection means adapted to enable connection of said unidirectional processing card to upstream and downstream processing devices using standard keyed cable assemblies.

4. The apparatus according to claim 1, wherein said unidirectional processing card comprises an optical amplifier.

5. The apparatus according to claim 4, wherein said optical amplifier comprises an Erbium Doped Fiber Amplifier (EDFA).

6. The apparatus according to claim 1, wherein said unidirectional processing card comprises a dispersion compensation module (DCM).

7. The apparatus according to claim 1, wherein said pass through connection means comprises an optical medium.

8. The apparatus according to claim 1, wherein said pass through connection means comprises an electrical medium.

9. A virtual bi-directional processing apparatus, comprising:
   an input port comprising a transmit connector and a receive connector;
   an output port comprising a transmit connector and a receive connector;
   a unidirectional processing element connected between the receive connector of said input port and the transmit connector of said output port; and
   a pass through connection comprising a passive non-switched fixed path coupling the receive connector of said output port to the transmit connector of said input port such that signals received from a downstream device at the receive connector of said output port are sent unchanged over said passive non-switched fixed path to the transmit connector of said input port for transmission to an upstream device thereby enabling the upstream connection of said input port to said up stream device using a first standard duplex connection cable, and the downstream connection of said output port to said downstream device using a second standard duplex connector cable.

10. The apparatus according to claim 9, wherein said pass through connection is adapted to convey optical signals.

11. The apparatus according to claim 9, wherein said pass through connection is adapted to convey electrical signals.

12. The optical network device according to claim 9, wherein said unidirectional processing element comprises an optical amplifier.

13. The apparatus according to claim 12, wherein said optical amplifier comprises an Erbium Doped Fiber Amplifier (EDFA).

14. The apparatus according to claim 9, wherein said unidirectional processing element comprises a dispersion compensation module (DCM).

15. An optical network, comprising:
   a plurality of bi-directional processing cards each comprising a first input port having a transmit terminal and a receive terminal and a first output port having a transmit terminal and a receive terminal:
   at least one virtual bi-directional processing card comprising:
      a second input port having a transmit terminal and a receive terminal:
      a second output port having a transmit terminal and a receive terminal:
      a unidirectional processing element coupled between the receive terminal of said second input port and the transmit terminal of said second output port; and
      a pass through optical fiber for optically coupling, via a passive non-switched fixed path, the receive terminal of said second output port to the transmit terminal of said second input port such that signals received from a downstream circuit card at the receive terminal of said second output port are sent unchanged over said passive non-switched fixed path to the transmit terminal of said second input port for transmission to an upstream device thereby enabling the upstream connection of said second input port to said upstream device using a first standard duplex connection cable, and the downstream connection of said second output port to said downstream device using a second standard duplex connector cable.

16. The optical network device according to claim 15, wherein said unidirectional processing element comprises an optical amplifier.

17. The optical network device according to claim 16, wherein said optical amplifier comprises an Erbium Doped Fiber Amplifier (EDFA).

18. The optical network device according to claim 15, wherein said unidirectional processing element comprises a dispersion compensation module (DCM).

19. The optical network device according to claim 15, wherein said at least one virtual bi-directional processing card is connected to bi-directional processing cards via standard keyed duplex optical fiber cable assemblies.

* * * * *